(12) United States Patent
Murphy

(10) Patent No.: US 11,686,162 B2
(45) Date of Patent: Jun. 27, 2023

(54) WIRELESS ELECTRICAL FEEDTHROUGH WETMATE CONNECTOR

(71) Applicant: FMC Technologies, Inc., Houston, TX (US)

(72) Inventor: Richard M. Murphy, Houston, TX (US)

( * ) Notice: Subject to any disclaimer, the term of this patent is extended or adjusted under 35 U.S.C. 154(b) by 511 days.

(21) Appl. No.: 16/325,108

(22) PCT Filed: Sep. 7, 2016

(86) PCT No.: PCT/US2016/050544
§ 371 (c)(1),
(2) Date: Feb. 12, 2019

(87) PCT Pub. No.: WO2018/048396
PCT Pub. Date: Mar. 15, 2018

(65) Prior Publication Data
US 2021/0285291 A1    Sep. 16, 2021

(51) Int. Cl.
*E21B 47/12*       (2012.01)
*H04B 5/02*        (2006.01)
(Continued)

(52) U.S. Cl.
CPC ...... *E21B 17/0283* (2020.05); *E21B 41/0085* (2013.01); *E21B 47/12* (2013.01);
(Continued)

(58) Field of Classification Search
CPC .. E21B 17/0283; E21B 41/0085; E21B 47/12; E21B 17/02; E21B 17/028;
(Continued)

(56) References Cited

U.S. PATENT DOCUMENTS

| 8,988,178 B2 * | 3/2015 | Deville | E21B 47/13 336/212 |
| 2001/0027865 A1 | 10/2001 | Wester | |

(Continued)

FOREIGN PATENT DOCUMENTS

| WO | WO-2014167730 A1 * | 10/2014 | H04N 19/129 |
| WO | WO-2015057608 A2 * | 4/2015 | E21B 33/038 |
| WO | WO-2015187908 A1 * | 12/2015 | E21B 17/003 |

*Primary Examiner* — Blane J Jackson
(74) *Attorney, Agent, or Firm* — Henry C. Query, Jr.

(57) ABSTRACT

A wetmate connector for wirelessly communicating data or power signals between first and second components includes a first connector half which is mountable to the first component and a second connector half which is mountable to the second component. The first connector half includes a first internal cavity and a first wireless communications device which is positioned in the first internal cavity. The first wireless communications device is operable to transmit or receive wireless data and/or power signals, and the first internal cavity is sealed from an external environment at least when the first connector half is mounted to the first component. The second connector half includes a second internal cavity and a second wireless communications device which is positioned in the second internal cavity. The second wireless communications device is operable to transmit or receive wireless data or power signals, and the second internal cavity is sealed from the external environment at least when the second connector half is mounted to the second component.

26 Claims, 6 Drawing Sheets

(51) Int. Cl.
  *E21B 17/02* (2006.01)
  *H02J 50/10* (2016.01)
  *E21B 41/00* (2006.01)
  *H01F 38/14* (2006.01)
  *H04B 5/00* (2006.01)

(52) U.S. Cl.
  CPC .............. *H01F 38/14* (2013.01); *H02J 50/10* (2016.02); *H04B 5/0025* (2013.01); *H04B 5/0075* (2013.01); *H04B 5/02* (2013.01); *H01F 2038/143* (2013.01)

(58) Field of Classification Search
  CPC .. H02J 50/10; H04B 5/00; H04B 5/02; H04B 5/0025; H04B 5/0075; H04B 5/0031; H01F 38/14
  See application file for complete search history.

(56) References Cited

U.S. PATENT DOCUMENTS

| | | |
|---|---|---|
| 2012/0175969 A1 | 7/2012 | Maughan et al. |
| 2013/0269945 A1 | 10/2013 | Mulholland et al. |
| 2013/0321223 A1 | 12/2013 | Bokenfohr et al. |
| 2016/0069178 A1* | 3/2016 | Mulholland ............ E21B 47/13 340/854.7 |

* cited by examiner

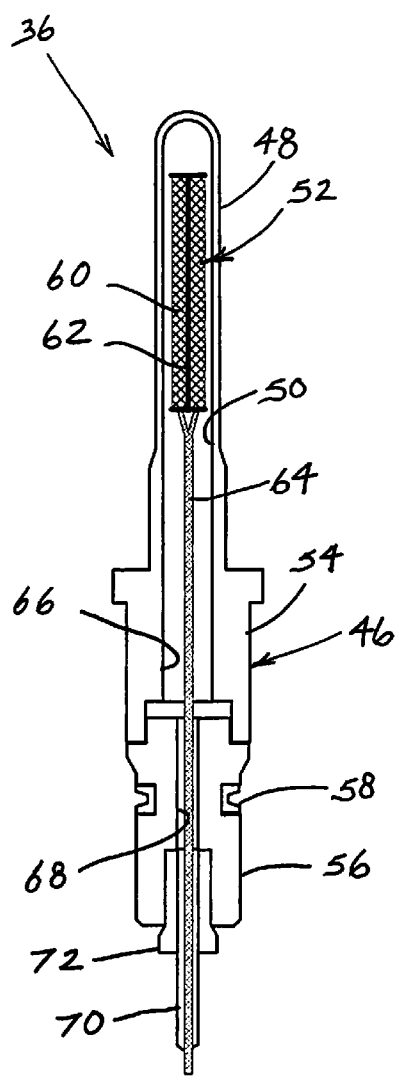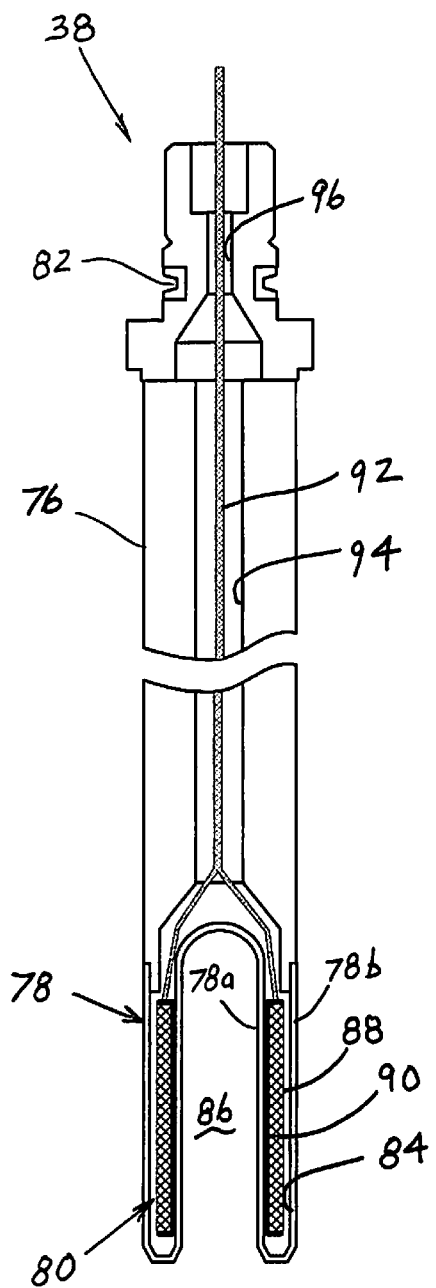
Fig. 4
Fig. 5

WIRELESS ELECTRICAL FEEDTHROUGH WETMATE CONNECTOR

The present invention is directed to a wetmate connector for communicating data and/or power signals between adjacent components of a subsea production and/or processing system. More specifically, the invention is directed to a wetmate connector which is operable to communicate the data and/or power signals wirelessly between the wetmate connector halves, for example using a near field magnetic induction communications system, thereby enabling the wireless communications devices in the connector halves to remain isolated from the external environment and eliminating the need to establish a direct electrical connection between the communications devices.

BACKGROUND OF THE INVENTION

Subsea hydrocarbon productions systems commonly include a wellhead which is positioned at the upper end of the wellbore, a tubing hanger which is landed in the wellhead, and a christmas tree which is mounted to the top of the wellhead. In order to provide the subsea well operator with an understanding of the conditions in the wellbore, subsea hydrocarbon production systems usually must be designed with the ability to measure various wellbore parameters, such as pressure and temperature. Thus, these systems are normally provided with a number of downhole sensors which are in communication with, e.g., an external monitoring and control system. Communication between the monitoring and control system and each downhole sensors is often achieved using an external electrical cable which is connected between the monitoring and control system and the tree, a downhole electrical cable which is connected to the downhole sensor, and an electrical feedthrough system which connects the external cable to the downhole cable through the tree and the tubing hanger.

Prior art electrical feedthrough systems may have a variety of forms but often include a first cable which extends through a feedthrough bore in the tree and is connected to the external cable, a second cable which extends through a feedthrough bore in the tubing hanger and is connected to the downhole cable, and a wetmate connector which connects the first cable to the second cable when the tree is landed on the wellhead. In particular, the wetmate connector includes a female connector half which is connected to the first cable and secured in the bottom of the christmas tree feedthrough bore and a male connector half which is connected to the second cable and secured in the top of the tubing hanger feedthrough bore. Once the tree is landed on the wellhead, the female connector half engages the male connector half to thereby electrically connect the downhole sensor to the external monitoring and control system.

One problem with such wetmate connectors is that they require direct contact between the conductors in the male and female connector halves. In a seawater environment, the connection between these conductors must be established in a non-conductive medium, such as a dielectric fluid or gel. Failure to isolate the electrical conductors from the conductive seawater or well fluid will result in a shorting of the feedthrough system, which will render the downhole sensor useless. Prior art wetmate connectors use a complex set of isolation seals and compensated bladders to ensure that the connection between the conductors in the male and female connector halves is void of any conductive medium both during and after the connection is established. However, the isolations seals are prone to being damaged during makeup of the wetmate connector. In addition, the amount of dielectric fluid in the bladders surrounding the electrical connection is typically depleted each time the connection is broken, which limits the number of times the connection can be made up. A failure of the wetmate connector results in a loss of communication between the downhole sensor and the monitoring and control system, thus hindering the monitoring of the corresponding wellbore parameter.

SUMMARY OF THE INVENTION

In accordance with the present invention, these and other limitations in the prior art are addressed by providing a wetmate connector for wirelessly communicating data and/or power signals between first and second components, the wetmate connector comprising a first connector half which is mountable to the first component, the first connector half including a first internal cavity and a first wireless communications device which is positioned in the first internal cavity, the first wireless communications device being operable to transmit and/or receive wireless data and/or power signals, and the first internal cavity being sealed from an external environment at least when the first connector half is mounted to the first component; and a second connector half which is mountable to the second component, the second connector half including a second internal cavity and a second wireless communications device which is positioned in the second internal cavity, the second wireless communications device being operable to transmit and/or receive wireless communications and/or power signals, and the second internal cavity being sealed from the external environment at least when the second connector half is mounted to the second component. The first connector half is movable relative to the second connector half into and out of an engaged position in which the first and second wireless communications devices are in operable proximity. In this manner, the first and second wireless communications devices are operable to communicate wireless data and/or power signals between each other while each is isolated from the external environment in a respective sealed cavity.

In accordance with one embodiment of the invention, the first connector half may comprise a shaft portion which extends axially from the first component and within which the first cavity is located. Also, the second connector half may comprise a housing portion which is spaced axially from the second component and within which the second cavity is located.

In an accordance with a further embodiment of the invention, when the first and second connector halves are in the engaged position, the first and second wireless communications devices are spaced axially relative to each other.

In another embodiment of the invention, when the first and second connector halves are in the engaged position, the first and second wireless communications devices are spaced radially relative to each other. In this embodiment, the second cavity may comprise an annular configuration and the housing portion may comprise an external axial receptacle which is surrounded by the second cavity and is configured to receive the shaft portion of the first connector half. Further, when the first and second connector halves are in the engaged position, the first wireless communications device may be positioned coaxially within the second wireless communications device.

In yet another embodiment of the invention, the first and second wireless communications devices may comprise respective first and second magnetic transceivers which are configured to transmit and/or receive the wireless data and/or power signals using near field magnetic induction (NFMI) communications. In this embodiment, the first connector half may comprise a shaft portion which extends axially from the first component and within which the first cavity is located, and the second connector half may comprise a housing portion which is spaced axially from the second component and within which the second cavity is located.

In accordance with one aspect of the invention, when the first and second connector halves are in the engaged position, the first and second magnetic transceivers are spaced axially relative to each other.

In accordance with another aspect of the invention, when the first and second connector halves are in the engaged position, the first and second magnetic transceivers are spaced radially relative to each other. In this embodiment, the second cavity may comprise an annular configuration and the housing portion may comprise an external axial receptacle which is surrounded by the second cavity and is configured to receive the shaft portion of the first connector half. Furthermore, each of the first and second magnetic transceivers may comprise a cylindrical configuration. Thus, when the first and second connector halves are in the engaged position, the first magnetic transceiver is positioned coaxially within the second magnetic transceiver.

the present invention also provides a wireless wetmate connector which comprises a male connector half which includes an axially extending shaft portion and a male magnetic transceiver, the shaft portion comprising an internal first cavity within which the male magnetic transceiver is positioned; and a female connector half which includes a housing portion and a female magnetic transceiver, the housing portion comprising an external axially extending receptacle which is configured to receive the shaft portion and an internal annular second cavity which is positioned coaxially around the receptacle and within which the female magnetic transceiver is positioned. During use of the wetmate connector, the shaft portion is inserted into the receptacle portion and the male and female magnetic transceivers communicate wireless data and/or power signals through the shaft portion and the housing portion using near field magnetic induction (NMFI) communications.

The present invention further provides an electrical downhole feedthrough system for communicating data and/or power signals between an external device which is connected to a first subsea component and a downhole device which is connected to a second subsea component, the first and second subsea components comprising respective first and second feedthrough bores. The downhole feedthrough system comprises a wireless wetmate connector which includes a first connector half which is secured and sealed to an end of the first feedthrough bore closest to the first subsea component, the first connector half including a first internal cavity and a first wireless communications device which is positioned in the first internal cavity, the first wireless communications device being operable to transmit and/or receive wireless data and/or power signals, and the first internal cavity being sealed from an external environment; and a second connector half which is secured and sealed to an end of the second feedthrough bore closest to the first subsea component, the second connector half including a second internal cavity and a second wireless communications device which is positioned in the second internal cavity, the second wireless communications device being operable to transmit and/or receive wireless data and/or power signals, and the second internal cavity being sealed from the external environment. The first connector half is movable relative to the second connector half into and out of an engaged position in which the first and second wireless communications devices are in operable proximity. In this manner, the downhole feedthrough system is operable to communicate data and/or power signals between the external device and the downhole device through the wetmate connector while the first and second communications devices are isolated from the external environment in a respective sealed cavity.

In accordance with one aspect of this embodiment, the first connector half may comprise a shaft portion which extends axially from the first component and within which the first cavity is located, and the second connector half may comprise a housing portion which is spaced axially from the second component and within which the second cavity is located. Also, when the first and second connector halves are in the engaged position, the first and second wireless communications devices may be spaced axially relative to each other. Alternatively, when the first and second connector halves are in the engaged position, the first and second wireless communications devices may be spaced radially relative to each other.

In accordance with a further aspect of the invention, the second cavity may comprise an annular configuration and the housing portion may comprise an external axial receptacle which is surrounded by the second cavity and is configured to receive the shaft portion of the first connector half. In this embodiment, when the first and second connector halves are in the engaged position, the first wireless communications device is positioned coaxially within the second wireless communications device.

In accordance with a further aspect of the invention, the first and second wireless communications devices may comprise respective first and second magnetic transceivers which are configured to transmit and/or receive the wireless communications and/or power signals using near field magnetic induction (NFMI) communications. In this embodiment, the first connector half may comprise a shaft portion which extends axially from the first component and within which the first cavity is located, and the second connector half may comprise a housing portion which is spaced axially from the second component and within which the second cavity is located.

In accordance with one aspect of the invention, when the first and second connector halves are in the engaged position, the first and second magnetic transceivers may be spaced axially relative to each other.

In accordance with another aspect of the invention, when the first and second connector halves are in the engaged position, the first and second magnetic transceivers are spaced radially relative to each other. In this embodiment, the second cavity may comprise an annular configuration and the housing portion may comprise an external axial receptacle which is surrounded by the second cavity and is configured to receive the shaft portion of the first connector half. Furthermore, each of the first and second magnetic transceivers may comprise a cylindrical configuration. Accordingly, when the first and second connector halves are in the engaged position, the first magnetic transceiver is positioned coaxially within the second magnetic transceiver.

The present invention further provides a feedthrough communications system for a subsea hydrocarbon production system, the subsea production system comprising a wellhead which is positioned at the top of a wellbore, a tubing hanger which is landed in the wellhead, and a christmas tree which is connected to the top of the wellhead. The feedthrough communications system comprises a first connector portion which is connected to the tubing hanger, the first connector portion including a first magnetic transceiver which is configured to transmit and/or receive wireless data and/or power signals using near field magnetic induction (NFMI) communications; and a second connector portion which is connected to the christmas tree, the second connector portion including a second magnetic transceiver which is configured to transmit and/or receive wireless data and/or power signals using NFMI communications. When the christmas tree is connected to the top of the wellhead, the first magnetic transceiver is positioned in operable proximity to the second magnetic transceiver. In operation of the feedthrough communications system, the first and second magnetic transceivers are operable to communicate wireless data and/or power signals between each other.

In accordance with one embodiment of this invention, the subsea hydrocarbon production system may comprise a downhole device which is positioned on or below the tubing hanger and an external device which is positioned on or apart from the christmas tree. In this embodiment, the first connector portion is in communication with the downhole device and the second connector portion is in communication with the external device. Moreover, the first connector portion may be in wired communication with the downhole device and the second connection portion may be in wired communication with the external device.

The present invention also provides a method for transmitting wireless data and/or power signals between a christmas tree which is connected to the top of a wellhead and a tubing hanger which is landed in the wellhead. The method comprises mounting a first connector half to the tubing hanger, the first connector half including a first magnetic transceiver which is configured to transmit and/or receive wireless data and/or power signals using near field magnetic induction (NFMI) communications; mounting a second connector half to the christmas tree, the second connector half including a second magnetic transceiver which is configured to transmit and/or receive wireless data and/or power signals using NFMI communications; positioning the first and second magnetic transceivers in operable proximity to each other; and operating the first and second magnetic transceivers to communicate wireless data and/or power signals between each other.

Thus, the wetmate connector of the present invention is operable to communicate wireless data and/or power signals between the male and female connector halves without establishing a direct electrical connection between the male and female wireless communications device. The male and female wireless communications device are positioned in the internal cavities of the male and female connector halves, respectively, and are therefore isolated from the surrounding well fluids. Consequently, no possibility exists that the connection between the male and female connector halves will short out in the surrounding well fluids. Hence, seals and compensated bladders filled with dielectric fluid or gel are not required to isolate the connection from the surrounding environment. Accordingly, the wireless wet mate connector is more reliable than prior art wet mate connectors and can be made up and broken virtually an unlimited number of times.

In one embodiment of the invention, the wetmate connector eliminates the weaknesses of current electrical feedthrough systems by leveraging near field magnetic induction (NFMI) power and/or data transmission across the metal barriers of the male and female connector halves. Using NFMI technology, no penetrations or leak paths to the electrical components of the male and female connector halves are present. Isolation seals and compensated bladders filled with dielectric fluid or gel are no longer required since no actual physical contact between the male and female communications devices is required. By eliminating the isolation seals and compensation bladders, the reliability of the wetmate connector and the entire feedthrough system is drastically increased.

These and other objects and advantages of the present invention will be made apparent from the following detailed description, with reference to the accompanying drawings. In the drawings, the same reference numbers may be used to denote similar components in the various embodiments.

BRIEF DESCRIPTION OF THE DRAWINGS

FIG. 4 is an enlarged cross sectional view of the male transceiver component of the wireless wetmate connector of FIG. 1;

FIG. 5 is an enlarged cross sectional view of the female transceiver component of the wireless wetmate connector of FIG. 1;

DETAILED DESCRIPTION OF THE INVENTION

Figure 1:
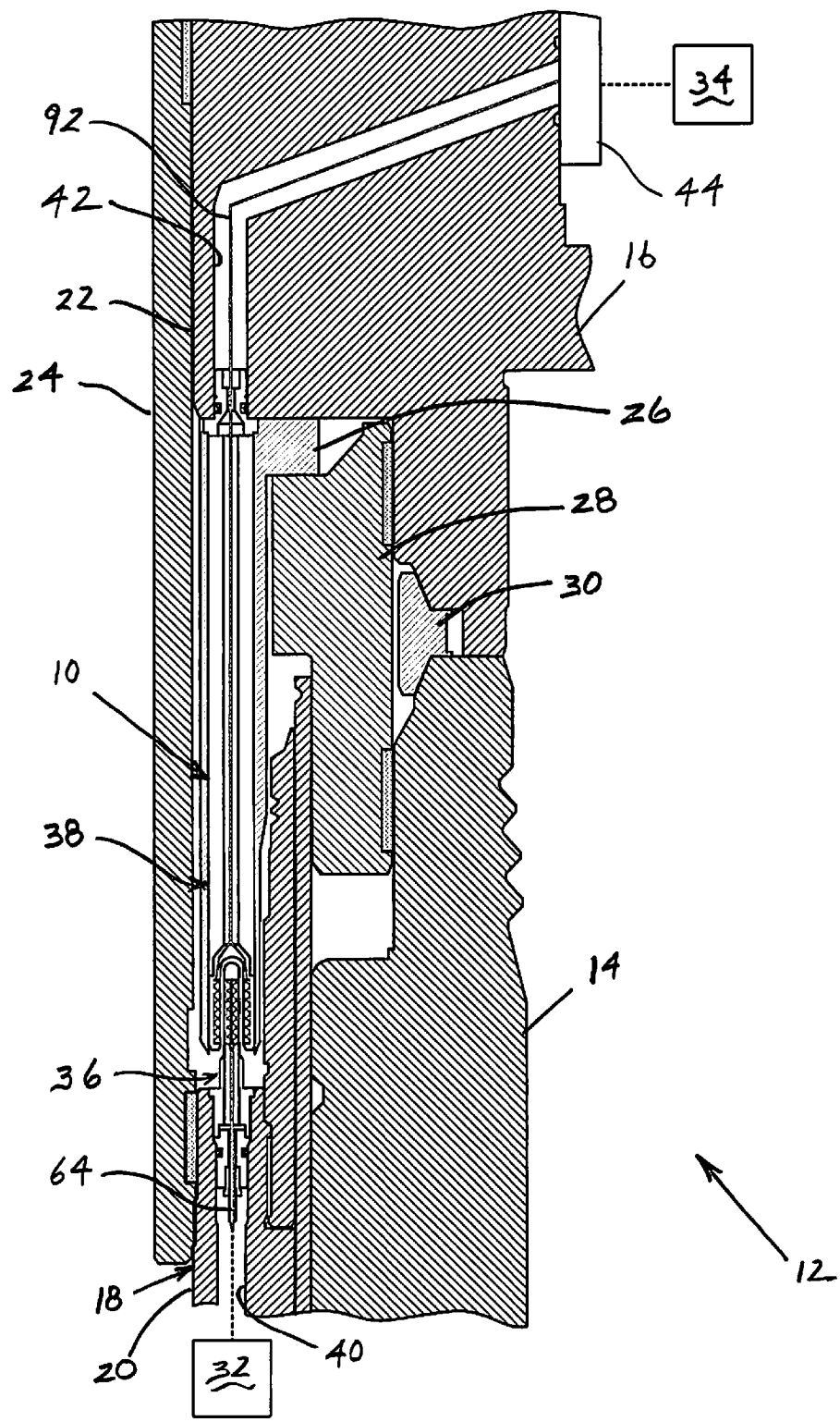
FIG. 1 is a cross sectional view of one embodiment of the wireless wetmate connector of the present invention shown installed in an illustrative subsea production system, only a portion of which is depicted.

The wetmate connector of the present invention is designed to wirelessly communicate data and/or power signals between two components. In general, the wetmate connector comprises a first connector half which is mountable to the first component and includes a first internal cavity and a first wireless communications device which is positioned in the first cavity. The first wireless communications device can be any device which is operable to communicate wireless data and/or power signals. Also, the first connector half is configured such that the first internal cavity is isolated from the external environment, at least when the first connector half is mounted to the first component.

The wetmate connector also comprises a second connector half which is mountable to the second component. Similar to the first connector half, the second connector half includes a second internal cavity and a second wireless communications device which is positioned in the second internal cavity. The second wireless communications device can be any device which is operable to communicate wireless data and/or power signals to or from the first wireless communications device. Also, the second internal cavity is isolated from the external environment, at least when the second connector half is mounted to the second component.

In use of the wetmate connector, the first connector half is movable relative to the second connector half into and out of an engaged position in which the first and second wireless communications devices are in operable proximity. The first communications device may be moveable relative to the second communications device by, e.g., movement of the first component relative to the second component during installation of the components. The first and second wireless communications devices are operable to communicate wireless data and/or power signals between each other while each is isolated from the external environment and without the need to establish a direct electrical connection between the communications devices. As used herein, the term "engaged position" should be interpreted to mean a position in which the first and second connector halves are in direct physical contact or, if not in direct physical contact, are in close proximity. Also, the term "operable proximity" should be interpreted to mean a distance at which the wireless data and/or power signals transmitted by one wireless transceiver can be effectively received by the other wireless transceiver in the environment in which the wetmate connector is designed to be used. Thus, in accordance with the present invention, the first and second connector halves need not be in physical contact. All that is required is that the first and second connector halves be positioned sufficiently close so that the particular type of wireless signals being transmitted by one wireless transceiver can be effectively received by the other wireless transceiver in the environment in which the wetmate connector is designed to be used.

Thus, the wireless wetmate connector of the present invention is designed to communicate data and/or power signals between the first and second connector halves without the need for a direct electrical connection between the connector halves. Consequently, the wetmate connector is particularly suitable for use in fluid environments, such as to communicate data and/or power signals between components of a subsea hydrocarbon production and/or processing system. A specific, non-limiting embodiment of the present invention which is specially adapted for use in a subsea hydrocarbon production system will now be described.

Referring to FIG. 1, the wireless wetmate connector of this embodiment of the invention, generally 10, is shown installed in a representative subsea hydrocarbon production system 12. The production system 12 includes a wellhead 14 which is installed at the upper end of a well bore, a christmas tree 16 which is connected to the top of the wellhead, and a tubing hanger 18 which is landed in the wellhead. As used herein, the term "wellhead" should be interpreted to mean any component in which a tubing hanger is normally landed, such as a tubing spool, a tubing head or the like. The tubing hanger 18 is connected to the top of a tubing string (not shown) which extends through the well bore to a hydrocarbon reservoir. The tubing hanger 18 includes a tubing hanger production bore 20, and the tree 16 includes a tree production bore 22 which is connected to the tubing hanger production bore through a production stab 24. The tree 16 is oriented to the tubing hanger 18 by an orientation bushing 26 and is secured to the top of the wellhead 14 by a subsea connector (not shown). In addition, the tree 16 is sealed to the wellhead by an isolation bushing 28 and a wellhead gasket 30.

In the exemplary embodiment of the invention shown in FIG. 1, the wireless wetmate connector 10 is used to communicate data and/or power signals between a downhole device 32 and an external device 34. The downhole device 32 can include any of a variety of devices which are normally used in hydrocarbon production and/or processing systems, such as but not limited to pressure and temperature sensors. Likewise, the external device 34 can comprise any of a variety of devices to which the downhole devices are commonly connected, including but not limited to a control module, a signal repeater and an umbilical.

Figure 2:
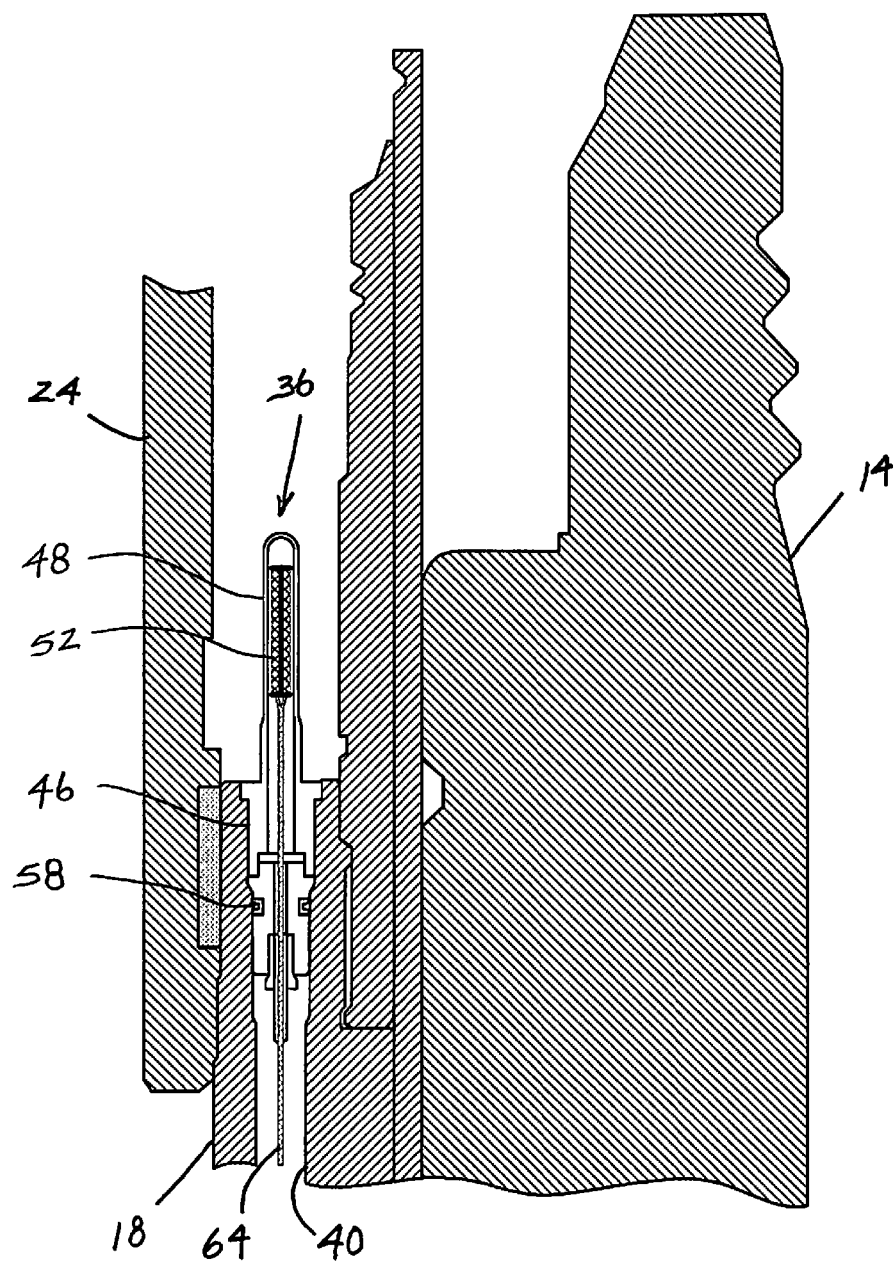
FIG. 2 is an enlarged cross sectional view of a portion of FIG. 1 showing only the male transceiver component of the connector.
Figure 3:
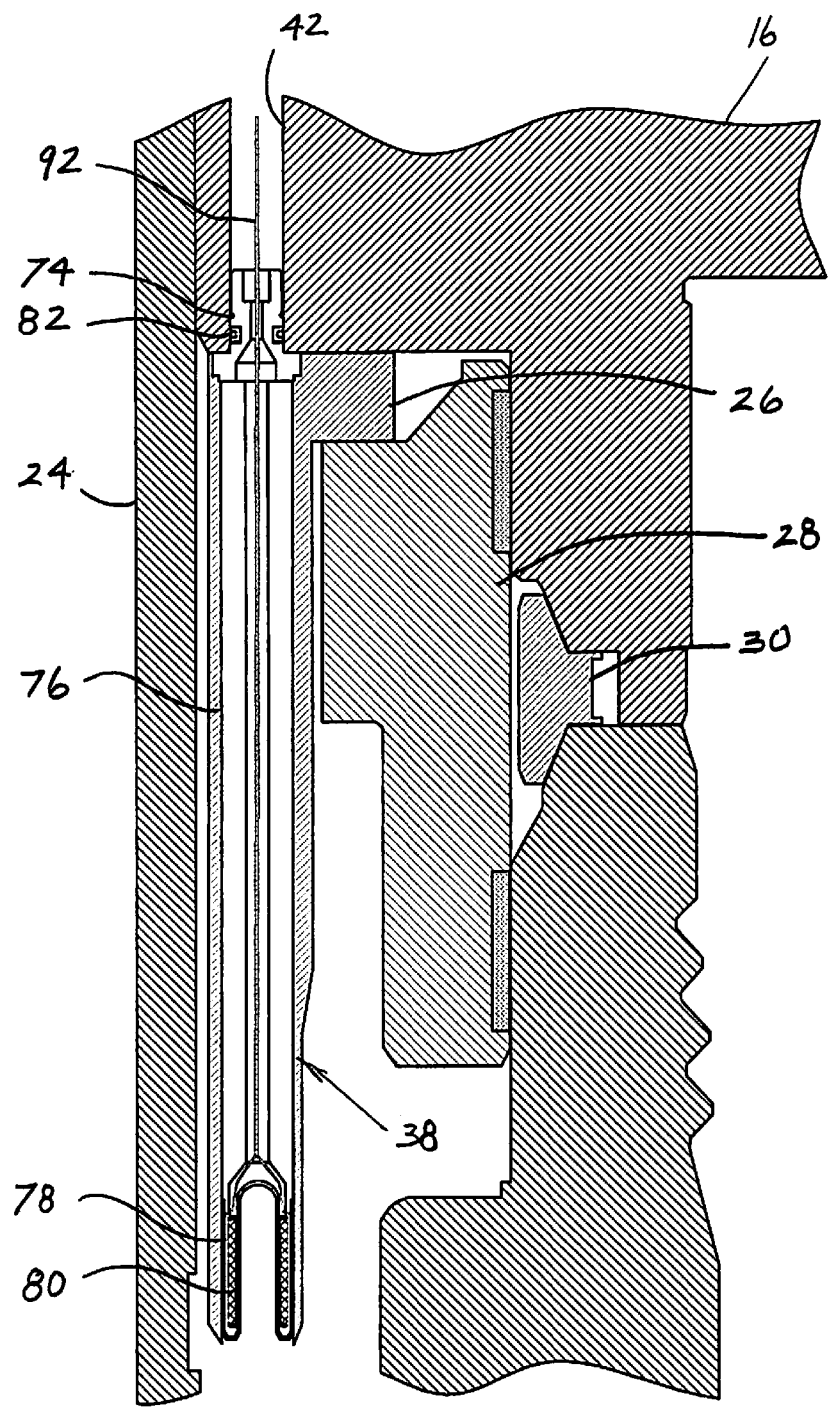
FIG. 3 is an enlarged cross sectional view of a portion of FIG. 1 showing only the female transceiver component of the connector.

Referring also to FIGS. 2 and 3, the wireless wetmate connector includes a male connector half 36 which is mounted in the tubing hanger 18 and a female connector half 38 which is mounted in the tree 16. (It should be understood, however, that the male connector half 36 could be mounted in the tree 16 and the female connector half 38 mounted in the tubing hanger 18.) In this embodiment of the invention, the male connector half 36 is mounted in the upper end of a feedthrough bore 40 which extends generally axially through the tubing hanger 18, and the female connector half 38 is mounted in the bottom of a feedthrough bore 42 which extends generally laterally through the tree 16 to, e.g., an outlet flange 44 that is mounted to the side of the tree.

Referring also to FIG. 4, the male connector half 36 includes a base portion 46 which is secured and sealed to the upper end of the tubing hanger feedthrough bore 40, an elongated shaft portion 48 which extends axially from the base portion and comprises an internal cavity 50, and a male wireless communications device 52 which is positioned within the cavity. The internal cavity 50 is sealed from the external environment, either by suitable sealing means (not shown) or, as in the present embodiment, by virtue of the fact that base portion 46 is sealed to the closed feedthrough bore 40. Consequently, the male wireless communications device 52 is isolated from the external environment.

In the particular embodiment of the invention shown in the drawings, the base portion 46 includes an upper base part 54 which is connected to or formed integrally with the shaft portion 48 and a lower base part 56 which is connected to or formed integrally with the upper base part. The upper and lower base parts 54, 56 may be formed as separate components which are connected together such as by welding during assembly of the male connector half 36. This will enable the wireless communications device 52 to be inserted into the shaft portion 48 prior to the upper and lower base parts 54, 56 being connected together. The base portion 46 may be secured to the tubing hanger feedthrough bore 40 via a threaded connection between, e.g., the lower base part 56 and the feedthrough bore. In addition, the base portion 46 may be sealed to the tubing hanger feedthrough bore 40 with a suitable ring seal 58 which is mounted on, e.g., the lower base part 56.

In this embodiment of the invention, the male wireless communications device 52 comprises a magnetic transceiver which is configured to transmit and/or receive using near field magnetic induction (NFMI) communications. As such, the male wireless communications device 52 includes a suitable magnet which is configured to generate a magnetic field in response to an applied current and to generate a current in response to an applied magnetic field. For example, the male wireless communications device 52 may comprise a coil of wire 60 which is wound around an optional core 62. The coil 60 may be maintained in position in the cavity 50 by, e.g., appropriate mechanical means or a suitable filler material. The ends of the coil 60 are connected to corresponding wires 64 which extend from the cavity 50 through axially aligned bores 66, 68 in the upper and lower base parts 54, 56, respectively. The wires 64 may be routed through the tubing hanger feedthrough bore 40 to a suitable connector (not shown) which is mounted to the tubing hanger 18 at the bottom of the feedthrough bore. As will be understood by persons of ordinary skill in the art, the connector at the bottom of the tubing hanger feedthrough bore 40 may in turn be connected to the downhole device 32 via conventional means, such as an electrical cable. If desired or required by a particular application, the wires 64 may be housed in a rigid tubing 70 which is secured to the lower base part 56 with an appropriate fitting 72.

Referring again to FIG. 3 and also to FIG. 5, the female connector half 38 includes a base portion 74 which is secured and sealed to the lower end of the christmas tree feedthrough bore 42, an elongated stem portion 76 which extends axially from the base portion, a housing portion 78 which is connected to a distal end of the stem portion, and a female wireless communications device 80 which is positioned in the housing portion. In one embodiment of the invention, the stem and housing portions 76, 78 are formed as separate components which are connected together such as by welding during assembly of the female connector half 38. This will enable the female wireless communications device 80 to be inserted into the housing portion 78 during assembly of the female connector half 38. The base portion 74 may be secured to the christmas tree feedthrough 42 bore via a threaded connection and sealed to the christmas tree feedthrough bore with a suitable ring seal 82.

In the embodiment of the invention shown in the drawings, the housing portion 78 may take the form of an axially elongated toroid comprising radially inner and outer walls 78a, 78b. As such, the inner and outer walls 78a, 78b will define an internal annular cavity 84 within which the female wireless communications device 80 is positioned, and the inner wall 78a will define an external axial receptacle 86 which is surrounded by the annular cavity and is configured to receive the shaft portion 48 of the male connector half 36. The internal cavity 84 is sealed from the external environment, either by suitable sealing means (not shown) or, as in the present embodiment, by virtue of the fact that base portion 74 is sealed to the closed feedthrough bore 42. Consequently, the female wireless communications device 80 is isolated from the external environment.

In the present embodiment, the female wireless communications device 80 comprises a magnetic transceiver which is configured to transmit and/or receive using near field magnetic induction (NFMI) communications. As such, the female wireless communications device 80 includes a suitable magnet which is configured to generate a magnetic field in response to an applied current and to generate a current in response to an applied magnetic field. For example, the female wireless communications device 80 may comprise a cylindrical coil of wire 88 which is wound around an optional core 90. The coil 88 may be maintained in position in the cavity 84 by, e.g., appropriate mechanical means or a suitable filler material. The two ends of the coil 88 are connected to corresponding wires 92 which extend through axially aligned bores 94, 96 in the stem portion 76 and the base portion 74, respectively. The wires 92 may be routed through the christmas tree feedthrough bore 42 to the outlet flange 44, which in turn may be connected to the external device 34 by suitable means, such as an electrical cable.

The shaft portion 48 of the male connector half 36 and the stem and housing portions 76, 78 of the female connector half 38 are sized so as to span the distance between the tree 16 and the tubing hanger 18 when the first and second connector halves are in the engaged position. Also, if an orientation bushing 26 is connected to the bottom of the tree 16, the female connector half 38 is preferably sized so that the distal end of the orientation bushing will extend beyond the distal end of the housing portion 78. The base and shaft portions 46, 48 of the male connector half 36 and the base, stem and housing portions 74, 76, 78 of the female connector half 38 are ideally made from a non-electrically conducting, preferably non-magnetic material, such as inconel. Also, although the shaft portion 48 of the male connector half 36 and the receptacle 86 of the female connector half 38 are depicted as being cylindrical, they may have any practical configuration.

Figure 8:
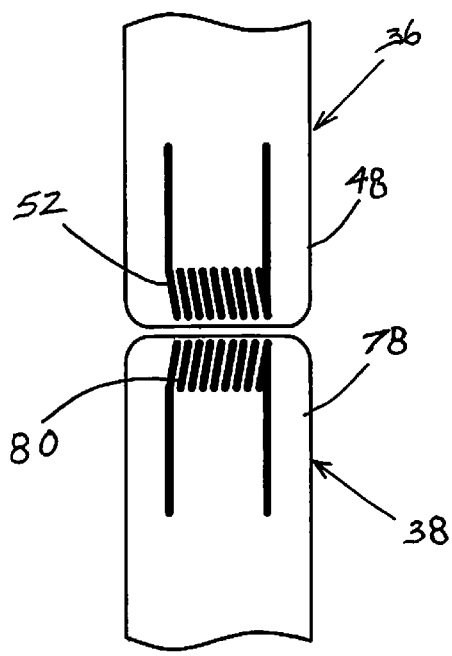
FIG. 8 is a cross sectional representation of portions of the male and female connector half components of another embodiment of the wireless wetmate connector of the present invention.

Furthermore, the housing portion 78 is not required to have a receptacle which is configured to receive the shaft portion 48, and the male and female wireless communications devices 52, 80 need not be arranged concentrically. For example, FIG. 8 depicts an embodiment of the wetmate connector of the present invention in which the shaft portion 48 of the male connector half 36 and the housing portion 78 of the female connector half 38 both comprise a cylindrical or rectangular configuration. In this embodiment, the male and female connector halves are in the engaged position when the distal ends of the shaft portion 48 and the housing portion 78 are generally aligned and in close proximity with each other. Also, the male and female wireless communications devices 52, 80 in this embodiment are spaced axially from each other rather than concentrically or radially, as in the previously described embodiment.

Figure 6:
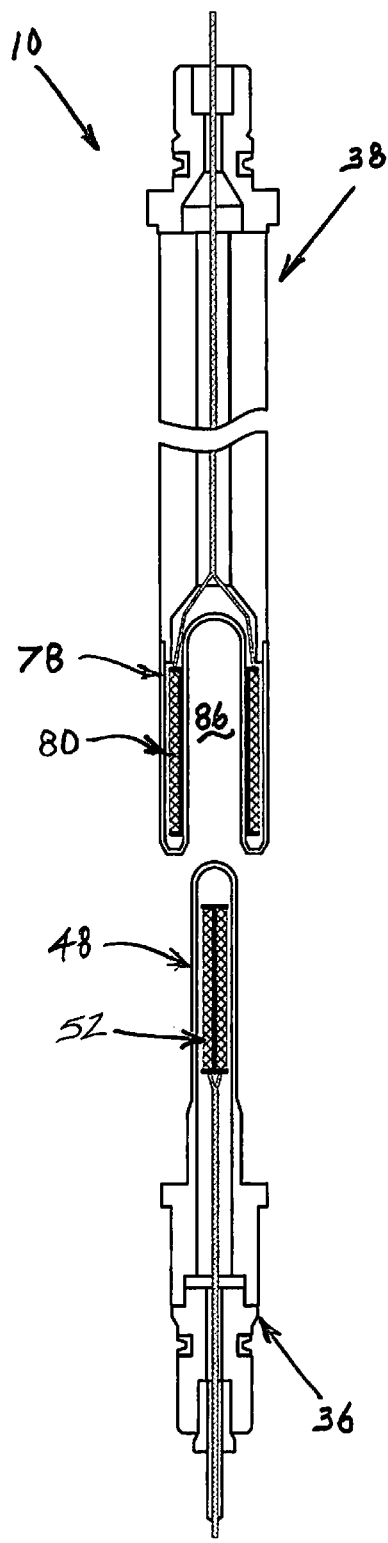
FIG. 6 is a cross sectional view of the wireless wetmate connector of FIG. 1 shown in the disengaged position.
Figure 7:
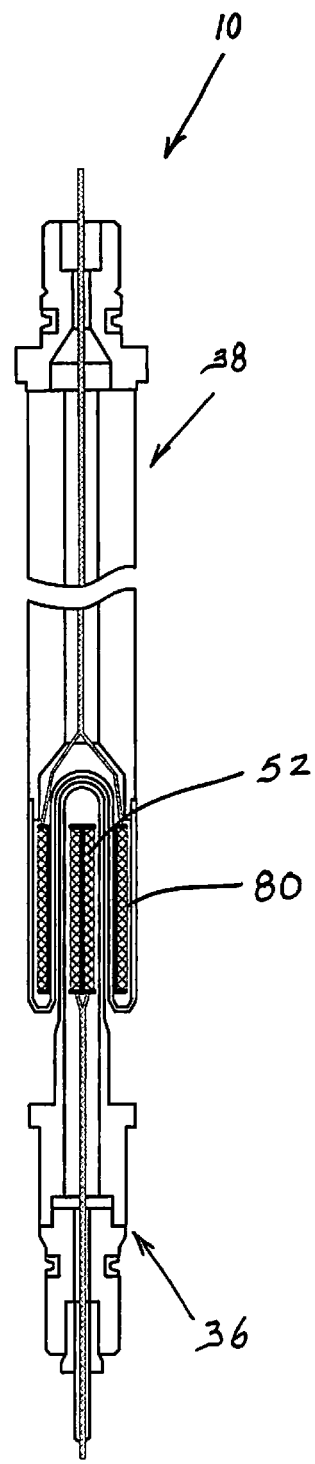
FIG. 7 is a cross sectional view of the wireless wetmate connector of FIG. 1 shown in the engaged position.

In the embodiment of the invention shown in the drawings, the male and female connector halves 36, 38 are brought into engagement as or after the tree 16 is landed onto the wellhead 14. During completion of the subsea hydrocarbon production system 12, the tree 16 is lowered from, e.g., a surface vessel onto the wellhead 14. Just before the tree 16 lands on the wellhead 14, the orientation bushing 26 (or some other known means) will position the tree in a predetermined orientation relative to the tubing hanger 18. As shown in FIG. 6, which depicts the disengaged position of the wetmate connector 10, before the tree 16 lands on the wellhead 14, the female connector half 38 is located directly above and in axial alignment with the male connector half 36. As the tree 16 is lowered into its final position on the wellhead 14, the receptacle 86 of the female connector half 38 will descend over and receive the shaft 48 of the male connector half 36. In an alternative embodiment of the invention, the male and female connector halves 36, 38 may be brought into operable proximity with each other by stroking one or the other connector half after the tree 16 is connected to the wellhead 14. As shown in FIG. 7, which depicts the fully engaged position of the wireless wetmate connector 10, when the male and female connector halves 36, 38 are fully engaged, the male wireless communications device 52 is positioned generally coaxially within the female wireless communications device 80. In this position, the magnetic field generated by the female wireless communications device 80 will be readily received by the male wireless communications device 52, and vice-versa.

Figure 9:
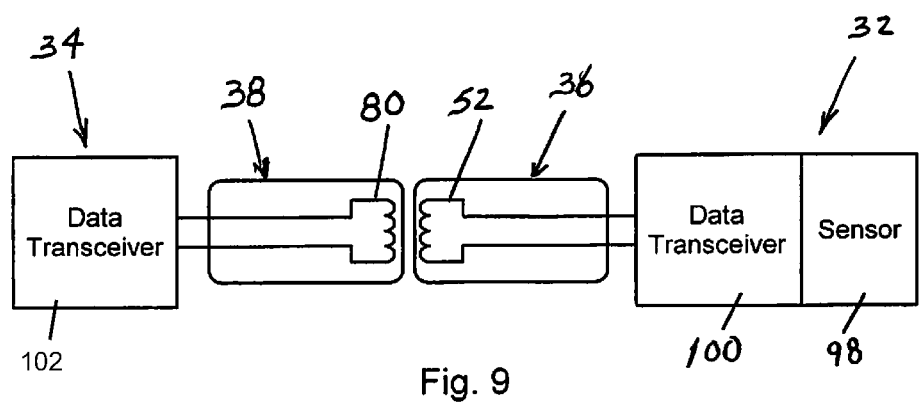
FIG. 9 is a schematic representation of one possible communications system which the wireless wetmate connector of the present invention may employ to transmit and/or receive wireless communications and/or data signals.

As discussed above, in one embodiment of the present invention the male and female wireless communications devices 52, 80 communicate with each other using a near-field magnetic induction (NFMI) communications system. As described more fully in U.S. Patent Application Publication No. US 2008/0070499 A1, which is hereby incorporated herein by reference, the NFMI communications system transmits signals over a low power, non-propagating magnetic field which is capable of passing through a conductive barrier. Referring to FIG. 9 for an example, the downhole device 32 may comprise, e.g., a temperature sensor 98 and a data transceiver 100. The sensor 98 generates a data signal which is indicative of the temperature of its surroundings. The data transceiver 100 includes suitable electronics for modulating an appropriate carrier signal with the data signal and for driving the male transceiver coil 58 with the resulting "processed" data signal in order to generate a time varying magnetic field. The magnetic field comprising the processed data signal propagates through the shaft portion 48 of the male connector half 36 and the housing portion 78 of the female connector half 38 and is impressed upon the female transceiver coil 88. The female transceiver coil 88 in turn generates a time-varying current representative of the processed data signal, and this current is communicated to a data transceiver 102 located in, e.g., the external device 34. The data transceiver 102 demodulates the processed data signal and transmits the resulting signal to, e.g., a subsea control module (SCM). It should be understood that communications from the SCM to the downhole device 32 may be achieved in a similar fashion. Furthermore, power for the downhole device 32 may be transmitted from the external device 34 to the downhole device in a similar manner using the NFMI communications system.

From the foregoing description it should be apparent that the male and female connector halves 36, 38 are configured to communicate data and/or electrical signals without establishing a direct electrical connection between the male and female wireless communications device 52, 80. The male and female wireless communications device 52, 80 are positioned in the internal cavities 50, 84 of the male and female connector halves, respectively, and are therefore isolated from the surrounding well fluids. Consequently, no possibility exists that the connection between the male and female connector halves 36, 38 will short out in the surrounding well fluids. Hence, seals and compensated bladders filled with a dielectric liquid or gel are not required to isolate the connection from the surrounding environment. Accordingly, the wireless wet mate connector 10 is more reliable than prior art wet mate connectors and can be engaged and disengaged virtually an unlimited number of times.

Although the wetmate connector 10 has been described as being used to establish communications between a tree and tubing hanger in a vertical production system 12, those skilled in the art would clearly understand how the wetmate connector can be adapted to provide for communications between the tree and tubing hanger in a horizontal production system. The scope of the present invention should therefore not be limited to the type of production system in which the wetmate connector is used.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A wetmate connector for wirelessly communicating data and/or power signals between first and second components, the wetmate connector comprising:
    a first connector half which is mountable to the first component, the first connector half including a first internal cavity and a first wireless communications device which is positioned in the first internal cavity, the first wireless communications device being operable to transmit and/or receive wireless data and/or power signals, and the first internal cavity being sealed from an external environment at least when the first connector half is mounted to the first component; and
    a second connector half which is mountable to the second component, the second connector half including a second internal cavity and a second wireless communications device which is positioned in the second internal cavity, the second wireless communications device being operable to transmit and/or receive wireless communications and/or power signals, and the second internal cavity being sealed from the external environment at least when the second connector half is mounted to the second component;
    wherein the first connector half is movable relative to the second connector half into and out of an engaged position in which the first and second wireless communications devices are in operable proximity;
    whereby the first and second wireless communications devices are operable to communicate wireless data and/or power signals between each other while each is isolated from the external environment in a respective sealed cavity;
    wherein the first connector half comprises a shaft portion which extends axially from the first component and within which the first cavity is located;
    wherein the second connector half comprises a housing portion which is spaced axially from the second component and within which the second cavity is located;
    wherein the second cavity comprises an annular configuration and the housing portion comprises an external axial receptacle which is surrounded by the second cavity and is configured to receive the shaft portion of the first connector half; and
    wherein when the first and second connector halves are in the engaged position, the first wireless communications device is positioned coaxially within the second wireless communications device.

2. The wetmate connector of claim 1, wherein the first and second wireless communications devices comprise respective first and second magnetic transceivers which are configured to transmit and/or receive the wireless data and/or power signals using near field magnetic induction (NFMI) communications.

3. The wetmate connector of claim 2, wherein each of the first and second magnetic transceivers comprises a cylindrical configuration, and wherein when the first and second connector halves are in the engaged position, the first magnetic transceiver is positioned coaxially within the second magnetic transceiver.

4. The wetmate connector of claim 1, wherein the housing portion of the female connector half comprises coaxial inner and outer cylindrical walls, wherein the receptacle is surrounded by the inner wall, wherein the inner wall is closed proximate a first end of the housing portion to thereby define a base of the receptacle, wherein the inner and outer walls are connected together at a second end of the housing portion opposite the first end, and wherein the second cavity is located between the inner and outer walls.

5. A wireless wetmate connector which comprises:
    a male connector half which includes an axially extending shaft portion and a male magnetic transceiver, the shaft portion comprising an internal first cavity within which the male magnetic transceiver is positioned, the first cavity being sealed from an external environment when the first connector half is mounted to the first component; and
    a female connector half which includes a housing portion and a female magnetic transceiver, the housing portion comprising an external axially extending receptacle which is configured to receive the shaft portion and an internal annular second cavity which is positioned coaxially around the receptacle and within which the female magnetic transceiver is positioned, the second cavity being sealed from an external environment when the first connector half is mounted to the first component;

wherein during use of the wetmate connector the shaft portion is inserted into the receptacle portion and the male and female magnetic transceivers communicate wireless data and/or power signals through the shaft portion and the housing portion using near field magnetic induction (NFMI) communications.

6. The wireless wetmate connector of claim 5, wherein the housing portion of the female connector half comprises coaxial inner and outer cylindrical walls, wherein the receptacle is surrounded by the inner wall, wherein the inner wall is closed proximate a first end of the housing portion to thereby define a base of the receptacle, wherein the inner and outer walls are connected together at a second end of the housing portion opposite the first end, and wherein the second cavity is located between the inner and outer walls.

7. An electrical downhole feedthrough system for communicating data and/or power signals between an external device which is connected to a first subsea component and a downhole device which is connected to a second subsea component, the first and second subsea components comprising respective first and second feedthrough bores, the downhole feedthrough system comprising a wireless wetmate connector which includes:

a first connector half which is secured and sealed to an end of the first feedthrough bore closest to the second subsea component, the first connector half including a first internal cavity and a first wireless communications device which is positioned in the first internal cavity, the first wireless communications device being operable to transmit and/or receive wireless data and/or power signals, and the first internal cavity being sealed from an external environment; and a second connector half which is secured and sealed to an end of the second feedthrough bore closest to the first subsea component, the second connector half including a second internal cavity and a second wireless communications device which is positioned in the second internal cavity, the second wireless communications device being operable to transmit and/or receive wireless data and/or power signals, and the second internal cavity being sealed from the external environment;

wherein the first connector half is movable relative to the second connector half into and out of an engaged position in which the first and second wireless communications devices are in operable proximity;

whereby the downhole feedthrough system is operable to communicate data and/or power signals between the external device and the downhole device through the wetmate connector while the first and second communications devices are isolated from the external environment in a respective sealed cavity.

8. The downhole feedthrough system of claim 7, wherein the first connector half comprises a shaft portion which extends axially from the first component and within which the first cavity is located, and wherein the second connector half comprises a housing portion which is spaced axially from the second component and within which the second cavity is located.

9. The downhole feedthrough system of claim 8, wherein when the first and second connector halves are in the engaged position, the first and second wireless communications devices are spaced axially relative to each other.

10. The downhole feedthrough system of claim 8, wherein when the first and second connector halves are in the engaged position, the first and second wireless communications devices are spaced radially relative to each other.

11. The downhole feedthrough system of claim 10, wherein the second cavity comprises an annular configuration and the housing portion comprises an external axial receptacle which is surrounded by the second cavity and is configured to receive the shaft portion of the first connector half.

12. The downhole feedthrough system of claim 11, wherein when the first and second connector halves are in the engaged position, the first wireless communications device is positioned coaxially within the second wireless communications device.

13. The downhole feedthrough system of claim 12, wherein the housing portion of the female connector half comprises coaxial inner and outer cylindrical walls, wherein the receptacle is surrounded by the inner wall, wherein the inner wall is closed proximate a first end of the housing portion to thereby define a base of the receptacle, wherein the inner and outer walls are connected together at a second end of the housing portion opposite the first end, and wherein the second cavity is located between the inner and outer walls.

14. The downhole feedthrough system of claim 11, wherein the housing portion of the female connector half comprises coaxial inner and outer cylindrical walls, wherein the receptacle is surrounded by the inner wall, wherein the inner wall is closed proximate a first end of the housing portion to thereby define a base of the receptacle, wherein the inner and outer walls are connected together at a second end of the housing portion opposite the first end, and wherein the second cavity is located between the inner and outer walls.

15. The downhole feedthrough system of claim 7, wherein the first and second wireless communications devices comprise respective first and second magnetic transceivers which are configured to transmit and/or receive the wireless communications and/or power signals using near field magnetic induction (NFMI) communications.

16. The downhole feedthrough system of claim 15, wherein the first connector half comprises a shaft portion which extends axially from the first component and within which the first cavity is located, and wherein the second connector half comprises a housing portion which is spaced axially from the second component and within which the second cavity is located.

17. The downhole feedthrough system of claim 16, wherein when the first and second connector halves are in the engaged position, the first and second magnetic transceivers are spaced axially relative to each other.

18. The downhole feedthrough system of claim 16, wherein when the first and second connector halves are in the engaged position, the first and second magnetic transceivers are spaced radially relative to each other.

19. The downhole feedthrough system of claim 18, wherein the second cavity comprises an annular configuration and the housing portion comprises an external axial receptacle which is surrounded by the second cavity and is configured to receive the shaft portion of the first connector half.

20. The downhole feedthrough system of claim 19, wherein each of the first and second magnetic transceivers comprises a cylindrical configuration, and wherein when the first and second connector halves are in the engaged position, the first magnetic transceiver is positioned coaxially within the second magnetic transceiver.

21. The downhole feedthrough system of claim 19, wherein the housing portion of the female connector half comprises coaxial inner and outer cylindrical walls, wherein the receptacle is surrounded by the inner wall, wherein the inner wall is closed proximate a first end of the housing portion to thereby define a base of the receptacle, wherein the inner and outer walls are connected together at a second end of the housing portion opposite the first end, and wherein the second cavity is located between the inner and outer walls.

22. The downhole feedthrough system of claim 20, wherein the housing portion of the female connector half comprises coaxial inner and outer cylindrical walls, wherein the receptacle is surrounded by the inner wall, wherein the inner wall is closed proximate a first end of the housing portion to thereby define a base of the receptacle, wherein the inner and outer walls are connected together at a second end of the housing portion opposite the first end, and wherein the second cavity is located between the inner and outer walls.

23. A feedthrough communications system for a subsea hydrocarbon production system, the subsea production system comprising a wellhead which is positioned at the top of a wellbore, a tubing hanger which is landed in the wellhead, and a christmas tree which is connected to the top of the wellhead, the tubing hanger and the christmas tree comprising respective first and second feedthrough bores, the feedthrough communications system comprising:
   a first connector portion which is connected to the tubing hanger, the first connector portion including a first magnetic transceiver which is configured to transmit and/or receive wireless data and/or power signals using near field magnetic induction (NFMI) communications; and
   a second connector portion which is connected to the christmas tree, the second connector portion including a second magnetic transceiver which is configured to transmit and/or receive wireless data and/or power signals using NFMI communications;
   wherein the first connector portion is secured and sealed to an end of the first feedthrough bore closest to the christmas tree, the first connector portion including a first internal cavity within which the first magnetic transceiver is positioned, and the first internal cavity being sealed from an external environment;
   wherein the second connector portion is secured and sealed to an end of the second feedthrough bore closest to the tubing hanger, the second connector portion including a second internal cavity within which the second magnetic transceiver is positioned, and the second internal cavity being sealed from the external environment; and
   wherein when the christmas tree is moved into a position for connection to the top of the wellhead, the second connector portion is moved into an engaged position with the first connector portion in which the second magnetic transceiver is positioned in operable proximity to the first magnetic transceiver;
   whereby in operation of the feedthrough communications system, the first and second magnetic transceivers are operable to communicate wireless data and/or power signals between each other.

24. The feedthrough communications system of claim 23, wherein the subsea hydrocarbon production system comprises a downhole device which is positioned on or below the tubing hanger and an external device which is positioned on or apart from the christmas tree, and wherein the first connector portion is in communication with the downhole device and the second connector portion is in communication with the external device.

25. The feedthrough communications system of claim 23, wherein the first connector portion is in wired communication with the downhole device and the second connection portion is in wired communication with the external device.

26. A method for transmitting wireless data and/or power signals between a christmas tree which is connected to the top of a wellhead and a tubing hanger which is landed in the wellhead, the tubing hanger and the christmas tree comprising respective first and second feedthrough bores, the method comprising:
   mounting a first connector half to the tubing hanger, the first connector half including a first magnetic transceiver which is configured to transmit and/or receive wireless data and/or power signals using near field magnetic induction (NFMI) communications;
   mounting a second connector half to the christmas tree, the second connector half including a second magnetic transceiver which is configured to transmit and/or receive wireless data and/or power signals using NFMI communications;
   wherein the first connector half is secured and sealed to an end of the first feedthrough bore closest to the christmas tree, the first connector half including a first internal cavity within which the first magnetic transceiver is positioned, and the first internal cavity being sealed from an external environment;
   wherein the second connector half is secured and sealed to an end of the second feedthrough bore closest to the tubing hanger, the second connector half including a second internal cavity within which the second magnetic transceiver is positioned, and the second internal cavity being sealed from the external environment; and
   moving the christmas tree into a position for connection with the top of the wellhead to thereby position the first and second magnetic transceivers in operable proximity to each other; and
   operating the first and second magnetic transceivers to communicate wireless data and/or power signals between each other.

* * * * *